United States Patent [19]

Nelson et al.

[11] Patent Number: 5,568,358
[45] Date of Patent: Oct. 22, 1996

[54] MULTI-ATTITUDE DISPLAY LID POSITIONING ARRANGEMENT FOR CRAFTSPERSON'S PORTABLE SIGNAL PROCESSING AND COMMUNICATIONS UNIT

[75] Inventors: John R. Nelson, Leawood, Kans.; David T. Wathen, Woodland Hills, Calif.

[73] Assignee: Harris Corporation, Melbourne, Fla.

[21] Appl. No.: 343,697

[22] Filed: Nov. 14, 1994

[51] Int. Cl.⁶ ............................... H05K 5/00; E05D 3/06
[52] U.S. Cl. ............................ 361/681; 16/366; 235/1 D
[58] Field of Search .................................... 361/679–683; 16/287, 298, 302, 319, 328, 361, 366; 235/1 D; 364/708.1

[56] References Cited

U.S. PATENT DOCUMENTS

5,128,829  7/1992  Loew ...................................... 361/683

*Primary Examiner*—Gerald P. Tolin
*Assistant Examiner*—Jayprakash N. Gandhi
*Attorney, Agent, or Firm*—Charles E. Wands

[57] ABSTRACT

A contact-sensitive display screen panel of a craft unit is protected by a pivotable lid. The lid is rotatably supported by lid pivot attachments that enable the lid to be pivoted between closed and open positions, and to be stably locked as a support member in its fully extended attitude. Lid pin elements extend from opposite ends of a lid pin support element and engage left side and right side hinge assemblies. Each lid pin element has a tab element translatable along the underside of the lid. Each lid pin element is biased by a compression spring into engagement with a capturing slot in an interior bore of a post of a hinge arm element of a respective one of hinge assemblies. To rotate the lid from its open position, to its fully extended position, the craftsperson translate the tab elements against the biasing of compression springs, so that the lid pin element becomes unlocked from a slot in the interior bore of the hinge arm element of a respective hinge assembly. Once rotated to its fully extended position, finger pressure against the tab elements is released and the tab elements are allowed to again be biased by the compression springs, locking the reduced thickness portions of the lid pin elements in slots of the interior bores of the hinge arm elements of the hinge assemblies, so that the lid will be stably retained as a support element in its fully extended position.

22 Claims, 7 Drawing Sheets

MULTI-ATTITUDE DISPLAY LID POSITIONING ARRANGEMENT FOR CRAFTSPERSON'S PORTABLE SIGNAL PROCESSING AND COMMUNICATIONS UNIT

CROSS-REFERENCE TO RELATED APPLICATIONS

The present invention relates to subject matter disclosed in co-pending application Ser. No. 235,317 (hereinafter referenced as the '317 application), filed Apr. 29, 1994, entitled: "Telecommunication Test System Including a Test and Trouble Shooting Expert System," by K. R. Selig et al, and co-pending application Ser. No. 08/339,906 filed coincident herewith, by John Nelson et al, entitled: "Battery Charging and Signalling Interconnect Arrangement for Craftsperson's Portable Signal Processing and Communications Unit," (hereinafter referred to as the Nelson et al application), which applications are assigned to the assignee of the present application, and the disclosures of which are herein incorporated.

FIELD OF THE INVENTION

The present invention relates in general to a telephone craftsperson's portable test signal processing and communication (craft) unit, and is particularly directed to an arrangement for stably positioning a craft unit's display panel lid in any one of three attitudes (closed, open, and fully extended), so as to provide protection for the craft unit's display panel when the unit is not in use, to allow the craftsperson access to (viewing of) the display panel, and to allow the lid to be used as a mechanical prop or support for the craft unit, when the craft unit is placed on a support surface.

BACKGROUND OF THE INVENTION

Figure 1:
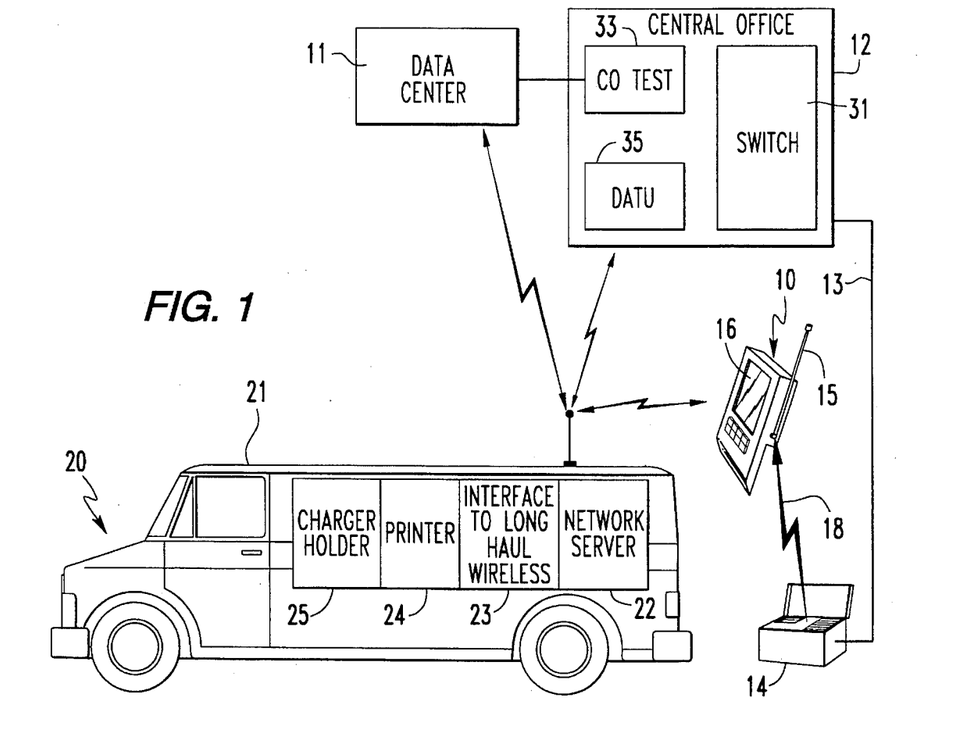
FIG. 1 diagrammatically illustrates a portable telecommunications test system described in the above-referenced co-pending '317 application.

The above-referenced co-pending '317 application describes a portable telecommunications test system, diagrammatically illustrated in FIG. 1 as comprising a handheld personal computer-based test and communications craft unit 10, through which a craftsperson, who has been directed by a dispatch center 11 to a service site located remotely with respect to a central office 12 serving a line 13 to be tested, may communicate with the central office and with a generic test head 14 that is connectable to the line under test. To reach the service site, the craftsperson employs a technician's service vehicle 20.

As described in the '317 application, the test system functionality of the supervisory control mechanism executed by the internal processor of the craft unit 10 provides the service technician with a user-friendly, icon-based, test procedure for facilitating the craftsperson performance of various tests on the line. In so doing, the portable craft unit 10 is able to interact with multiple types of existing operational support systems.

For this purpose, via a contact-sensitive (e.g., pen 15 touch-operated) video display panel 16 of hand-held craft unit 10, the craftsperson may selectively invoke one or more test operations represented by a set of analysis and test function-associated icons. In response to these selections, the internal control processor of craft unit 10 executes communication and signal processing operations associated with an identified test. The test head 14 proper performs data acquisition on demand from the computer within craft unit 10, including the execution of functional tests.

In order to communicate with a remote network facility (central office 12 or dispatch/data center 11), the craft unit 10 contains a transceiver interface, which is further interfaced with a communication and signal processing sub-system on board the technician's service vehicle 20. The communication and signal processing sub-system on board the van, in turn, links the craft unit 10 with the remote network facility, via either a short haul wireless link, or by way of an auxiliary back-up wireline link.

The central office facility 12 typically includes a central office switch 31, central office test devices 33, and a line-conditioning device 35, such as a direct access test unit (DATU), or (SASS) transmission conditioning system. The central office test devices 33 are capable of providing an interface with various operational support systems of the data center 11, such as a service vehicle dispatch, outside plant record database, automated testing systems, and electronic network schematics. The line-conditioning device (e.g. DATU or SASS) 35 within central office 12 provides the craftsperson with the ability to selectively conduct a number of tests of a line through the operation of either craft unit 10, or by invoking specified key combinations (sequences) from a standard craftsperson's telephone test set.

Within service van 20 is a battery-charging, communication and signal processing sub-system 21, that includes a network server 22, a long haul wireless interface 23, a printer 24, and a battery holder/charging station 25. The network server 22 contains a file server that provides additional processing power and electronic data storage, and performs auxiliary data processing tasks on demand from the craft unit 10. The long haul wireless interface 23 provides a wireless gateway to long haul wireless services. Printer 24 is available to print out various information, such as test results. As described in the above-referenced Nelson et al application, the battery holder/charging station 25 is not only configured to receive and store the portable craft unit 10, so that the power supply (battery pack) of craft unit 10 may be recharged, when not in use, but it is additionally equipped with a multi-pin signalling communication port, that allows the craft unit 10 to operated in a hands-free, 'on-line' condition while being stored and charged.

Figures 2, 3:
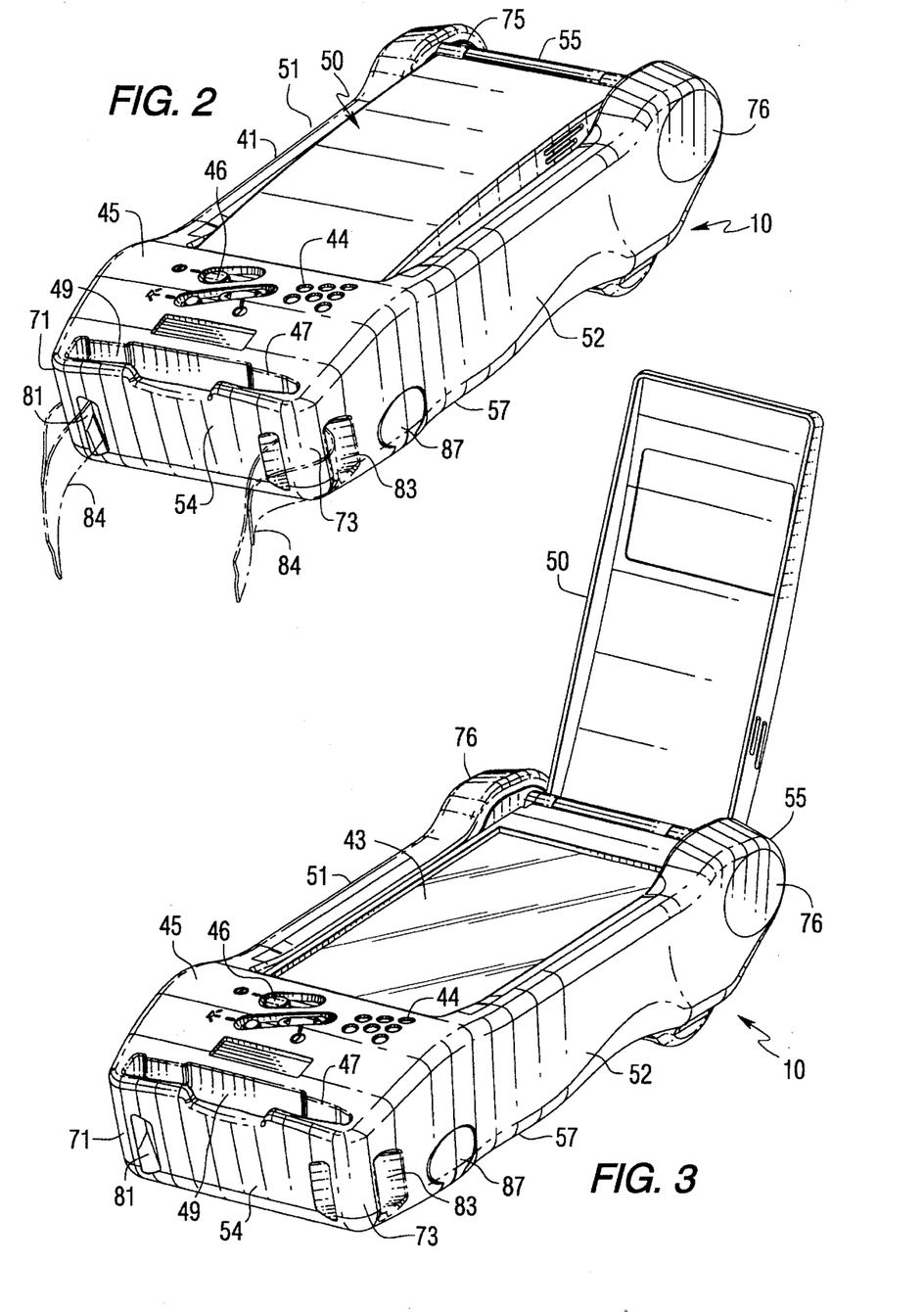
FIGS. 2, 3 and 4 are pictorial views of the housing configuration of a craft unit embodying the functionality described in the above-referenced co-pending '317 application, with its pivotable display panel lid in respective closed, open and fully extended positions.
Figure 4:
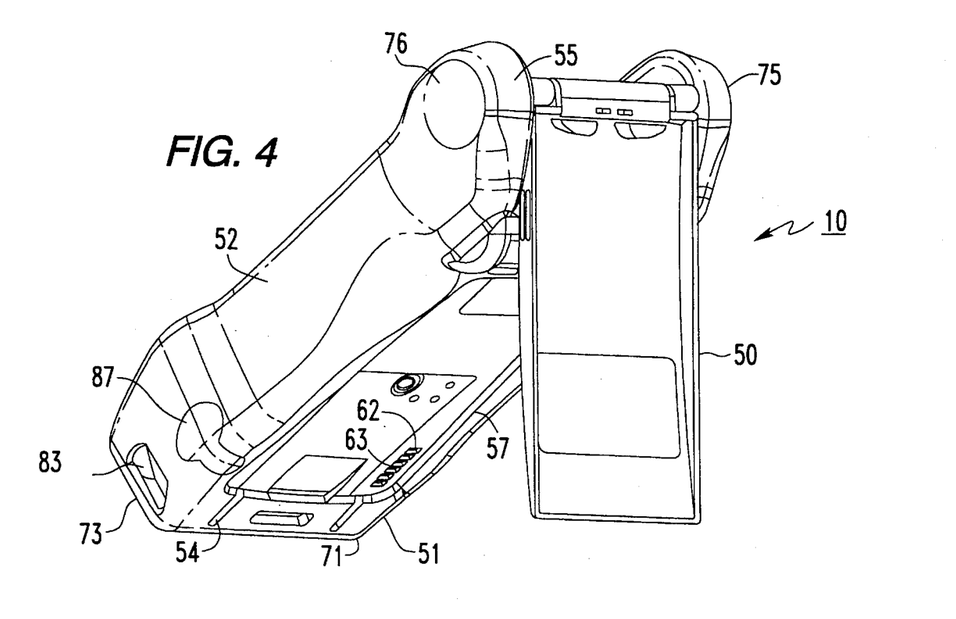

As further described in the above-referenced Nelson et al application, and as shown in FIGS. 2, 3 and 4, craft unit 10 is configured of a top portion 41 containing a display screen 43, such as a backlit liquid crystal display (LCD) screen, and an adjacent control element region 45. A protective lid 50 is arranged to be closed upon and protect display screen 43, when the craft unit is not in use. Control element region 45 may include one or more control buttons or switch elements 46 for operating the internal circuitry of the unit. Control element region may also include a depression or channel 47 in which a contact pen 49 may be captured, when not being used. Contact pen 49 may be employed by the craftsperson to touch or contact variously displayed icons or functional control buttons displayed on display screen 43, and thereby invoke specified operations associated with the displayed icons. Adjacent to control elements 46 are a plurality of audio apertures 44 beneath which an internal speaker is mounted.

Adjoining the top portion 41 of craft unit 10 are left and right side portions 51 and 52, a lower end portion 54 and an upper end portion 55. Each of these side and end portions further adjoins a bottom portion 57, which to contains a generally rectilinear arrangement 62 of recessed regions 63. This recessed region arrangement provides access to a multi-pin female terminal lead connector arrangement, the leads of which mate with corresponding male connector pins within a craft unit-receiving cup-like portion of the battery-charging and storage station. Left side portion 51 adjoins lower end portion 54 at corner region 71, while right side portion 52 adjoins lower end portion 54 at corner region 73. Each of these corner regions 71 and 73 has a respective passageway 81, 83 through which a support cord, such as a neck strap 84, may be secured.

Disposed in right side portion 52 adjacent to corner region 73 of the craft unit is a connector receptacle port 87, which is configured to support a cylindrically configured, sealed, multi-pin receptacle by way of which telephone communication signals and/or digital communication signals may be routed, via an associated sealed, cylindrically configured, plug assembly between the craft unit 10 and an external device, such as test head 14.

As noted above, the contact-sensitive display screen panel 43 of craft unit is protected by a pivotable lid 50, shown in its closed position in FIG. 2, in its open position in FIG. 3, and in its fully extended position in FIG. 4. Lid 50 is mechanically attached the craft unit by means of a left side lid pivot attachment 75 adjoining the intersection of the left side portion 51 with the upper end portion 55 of the craft unit, and a right side lid pivot attachment 76 adjoining the intersection of the right side portion 52 with upper end portion 55 of the craft unit.

SUMMARY OF THE INVENTION

In accordance with the present invention, these lid pivot attachments are configured to enable the lid to be easily pivoted between its closed and open positions, and to be stably locked as a support member in its fully extended attitude. The lid itself has a generally convex shape, following the contour of a pair of left and right side panels, through which the craftsperson grasps and pivots the lid from its closed attitude atop the display panel to its open or extended attitudes. Disposed along a rear edge of lid is a lid pin support element. Lid pin elements extend from opposite ends the lid pin support element and engage left side and right side hinge assemblies.

Each lid pin element has a cylindrical body portion, which is joined to a tab element by an arm therebetween. The arm fits within a slot in a longitudinal channel element disposed immediately adjacent to the lid pin support element at the rear edge of the lid. The tab element is translatable along the underneath side of the lid. Each lid pin element is biased by a compression spring toward a respective side panel of the lid, so that a chamfered end portion of the lid pin element is normally urged into engagement with a corresponding flat surface at an interior bore of a post of a hinge arm element of a respective one of hinge assemblies.

A respective hinge assembly has a hinge plate, a first side of which is generally flat and has a circular bore sized to accommodate a shaft extending from a first side of a hinge arm plate of a hinge arm element. This shaft extends through a cylindrical member at a second side of the hinge plate and is surrounded by a generally annular element having a key tab, that is sized and shaped to fit within a corresponding keyed slot in a respective one of the lid pivot attachments of the craft unit. Extending from a second side of the hinge arm element is a cylindrical post having an interior bore with a pin-capturing slot in which a chamfered end of a lid pin may be seated.

Adjacent to the shaft is a bump, which is sized to ride in an arcuate depression or channel in the first side of the hinge plate. Terminal ends of this arcuate depression or channel are deeper than the remainder of the arcuate depression and serve to capture and retain the hemispherical bump of the hinge arm element when seated therein by the action of a compression spring that surrounds the shaft of the hinge arm plate to an end portion of which a hinge arm cap is affixed. For this purpose, the compression spring is seated between an annular or circular depression in one face of a keyed ring member on a second side of the hinge plate, and a similar depression in the hinge arm cap. As a result, the compression spring is operative to push the hinge cap (to which and end of the hinge arm shaft is affixed) away from the second side of the hinge plate, and thereby urge or draw the hinge arm plate against the first side of the hinge plate in which the arcuate channel is formed. Consequently, the hemispherical bump on the hinge arm is firmly urged against the bottom of the arcuate depression or channel, so that upon engaging the deeper terminal ends of the arcuate channel, which define closed and open positions of the lid relative to the display panel, the lid will be firmly retained at those attitudes.

The radial length of the arcuate depression or channel is such as to limit pivotable movement of the lid between its closed and open positions, as long as the tab elements are in their normally spring biased positions, urging their associated lid pin elements into engagement with flat land surfaces of the interior bores of the hinge arm elements of the hinge assemblies.

To rotate the lid from its open position, to its fully extended position, the craftsperson translates the tab elements against the biasing of compression springs, so that the reduced thickness portion of the first end of each lid pin element becomes disengaged or unlocked from a slot in the interior bore of the hinge arm element of a respective hinge assembly. Once rotated 180° to its fully extended position, finger pressure against the tab elements is released and the tab elements are allowed to again be biased by the compression springs, locking the reduced thickness portions of the lid pin elements in slots of the interior bores of the hinge arm elements of the hinge assemblies, so that the lid will be stably retained as a support element in its fully extended position.

DETAILED DESCRIPTION

The following description will detail the manner in which the display panel cover lid of the above-described craft unit is mechanically attached by means of a left side lid pivot attachment adjoining the intersection of the left side portion with the upper end portion of the craft unit, and a right side lid pivot attachment adjoining the intersection of the right side portion with upper end portion of the craft unit. (It is to be understood that a left side component is complementary or a mirror image of a right side component.) As will be described, the lid pivot attachments are constructed and assembled, so that the lid may be stably positioned in any one of three attitudes (closed, open, and fully extended). As a consequence the lid is able to provide protection for the craft unit's display panel when the unit is not in use, to allow the craftsperson access to (viewing of) the display panel, and to allow the lid to be used as a mechanical prop or support for the craft unit, when the craft unit is placed on a support surface.

Figure 5:
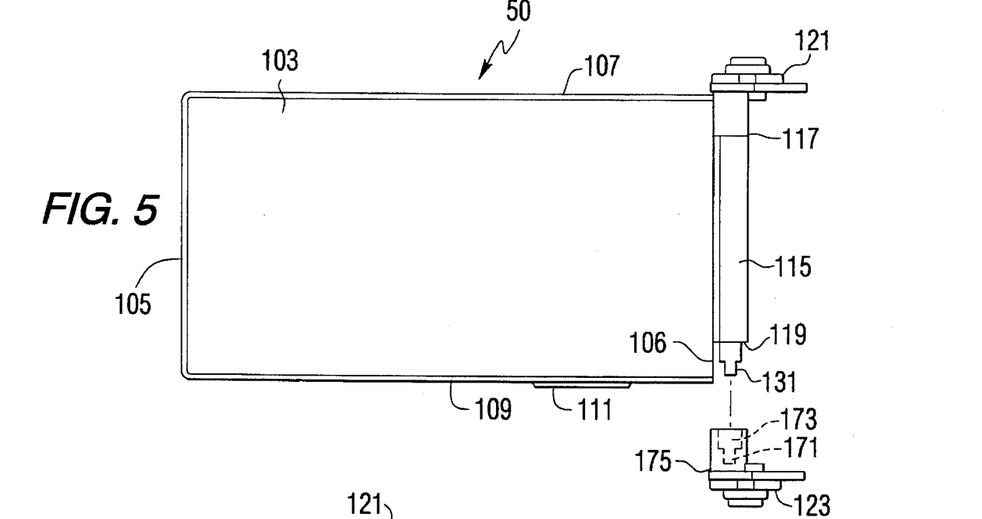
FIGS. 5, 6 and 7 are respective top, top perspective and bottom perspective views of a pivotable display panel lid.
Figures 6, 7:
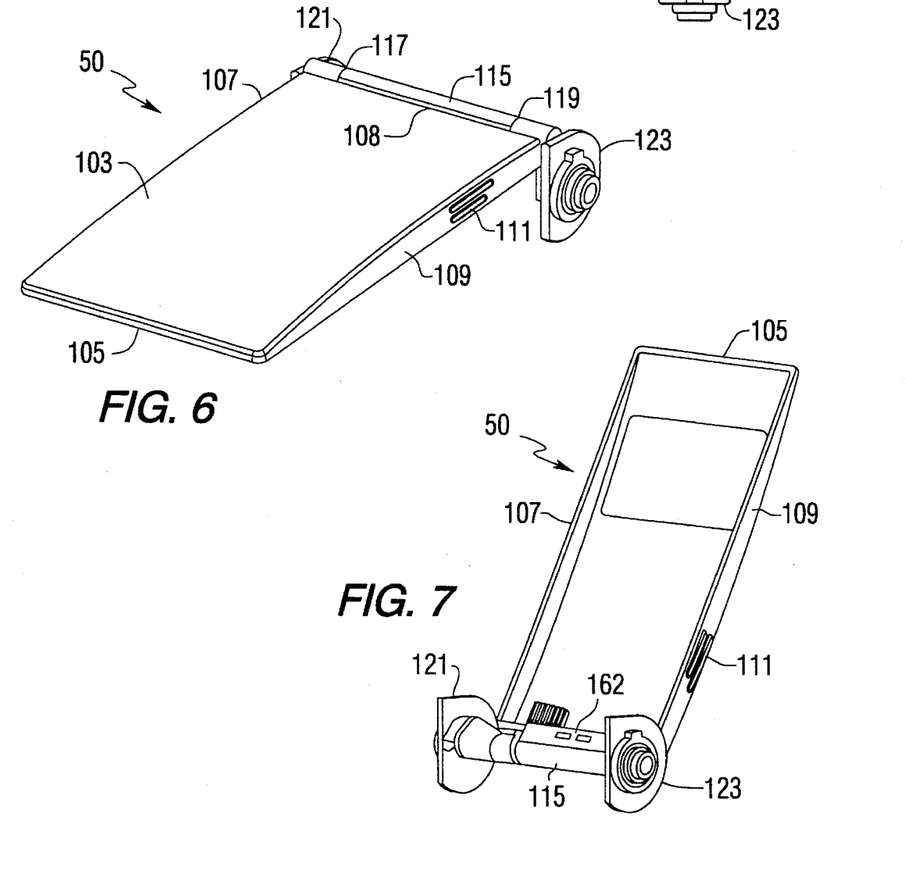

Referring now to FIGS. 5, 6 and 7, which are respective perspective top, top perspective and bottom perspective views of the pivotable display panel lid, a lid 50 is shown as having a generally convex configuration, as viewed from its top surface 103. The perimeter of lid 50 is defined by a front edge 105, a rear edge 106, a left side panel 107 and a right side panel 109. Raised (e.g. embossed) regions 111 on side panels 107, 109, facilitate a craftsperson grasping and pivoting the lid away from its closed attitude directly atop the display panel, as shown in FIG. 2, to its open or extended attitudes of FIGS. 3 and 4. Disposed along rear edge 106 of lid 50 is a generally longitudinally shaped lid pin support element 115. Lid pin support element has first and second ends 117 and 119, from which respective lid pin elements 131 extend toward the left and right side panels, so that they may engage left side and right side hinge assemblies 121 and 123, respectively.

Figure 8:
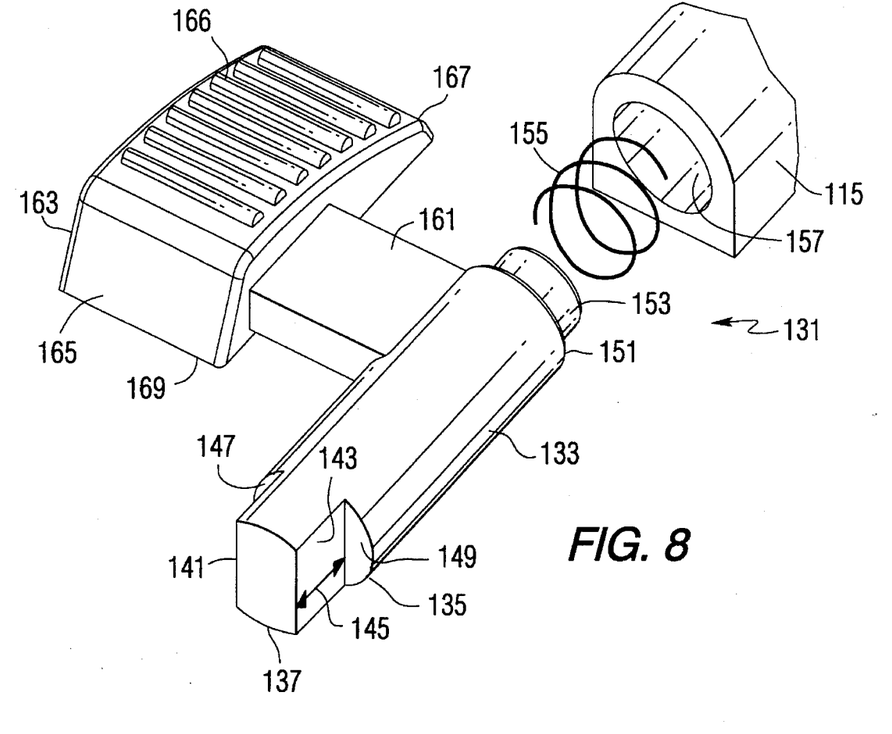
FIG. 8 shows the configuration of an individual lid pin element.

As shown in greater detail in FIG. 8, an individual lid pin element 131 has a cylindrical body portion 133, a first end 135 of which has a reduced thickness portion 137 defined by generally flat surfaces 141 and 143, which are chamfered to a prescribed depth 145 of cylindrical body portion 133, terminating at surfaces 147 and 149. Extending axially from a second end 151 of cylindrical body portion is a reduced diameter cylindrical portion 153. Reduced diameter cylindrical portion 153 is sized to receive a compression spring 155 and fit, together with the compression spring, into a cylindrical bore 157 of one end of lid pin support element 115.

Extending generally transversely from the second end 151 of cylindrical body portion 153 is an arm 161, which is joined to a tab element 163. Arm 161 is accommodated within a respective slot 162 in a longitudinal channel element, shown at 164 in the perspective bottom view of the lid of FIG. 9. As shown, channel element 164 is disposed immediately adjacent to lid pin support element 115 at the rear edge 106 of lid 50. Tab element 163 is tapered from a first end 165 thereof to a second end 167. Tab element 163 has textured top surface 166, to allow a craftsperson's finger to readily slide or translated the tab element. Tab element 163 also has a generally flat bottom surface 169, to conform with the underside surface 101 of the lid, so as to allow the tab element to be translated or slide transversely along the underside of the lid.

Figure 9:
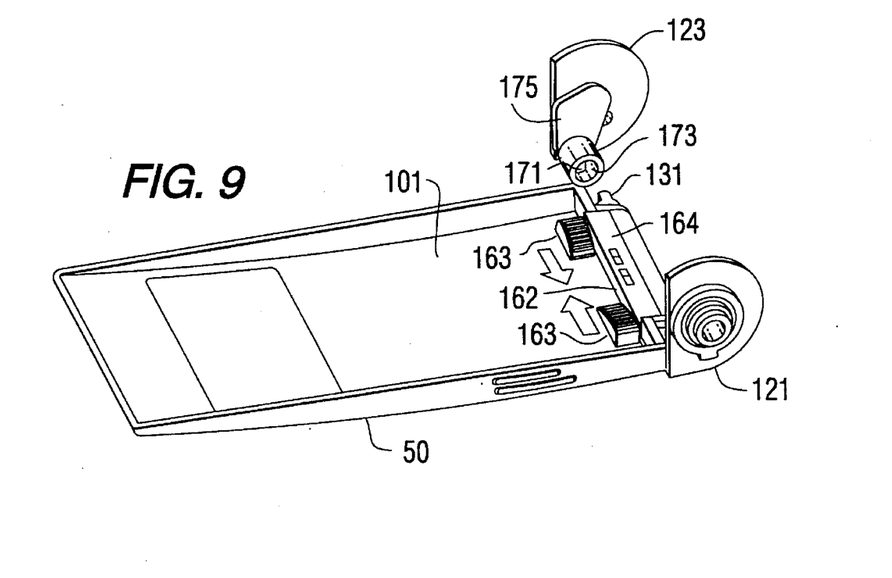
FIG. 9 is a perspective bottom view of a lid.
Figures 10, 15:
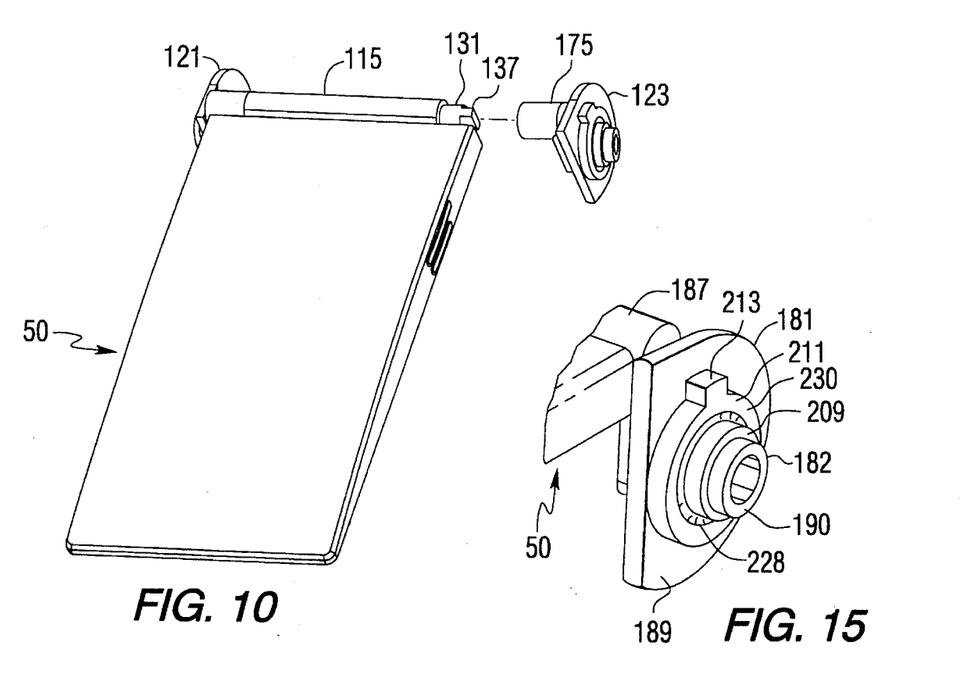
FIG. 10 is a top perspective view of a lid.
FIG. 15 diagrammatically illustrates the manner in which a shaft extends through a cylindrical member at a second side of a hinge plate.
Figure 11:
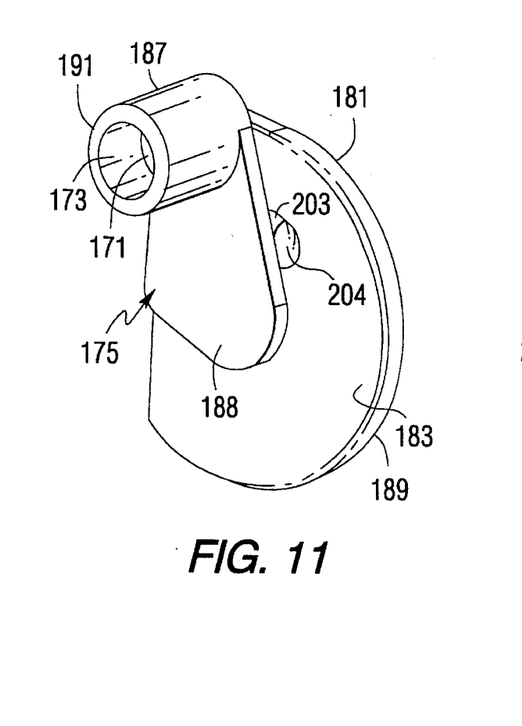
FIGS. 11–14 are respective perspective views of the configuration of a hinge assembly.
Figure 12:
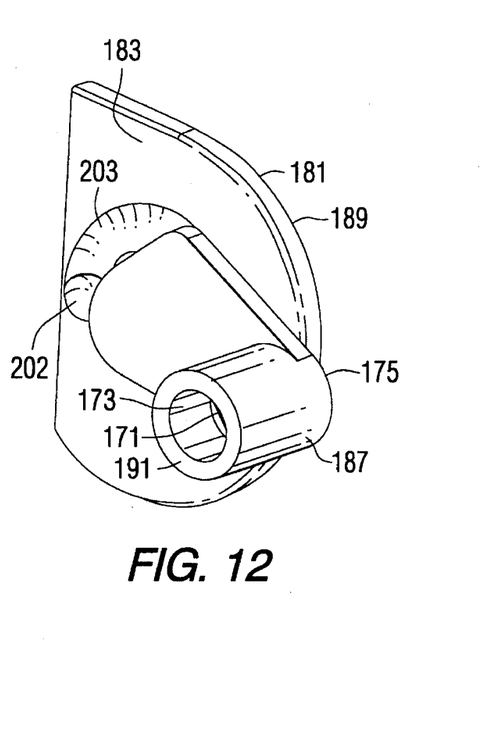
Figure 13:
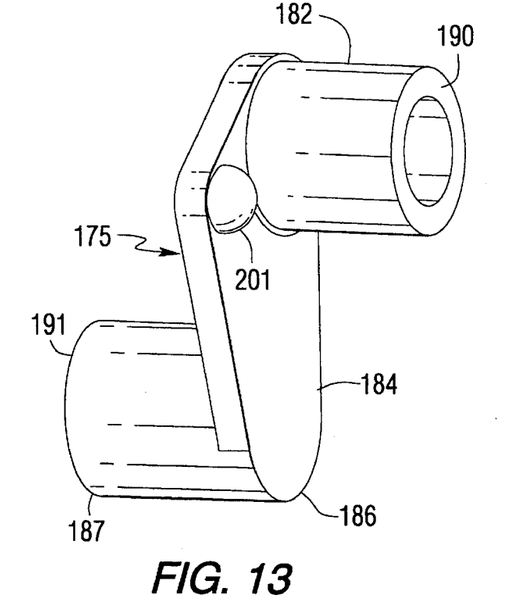
Figure 14:
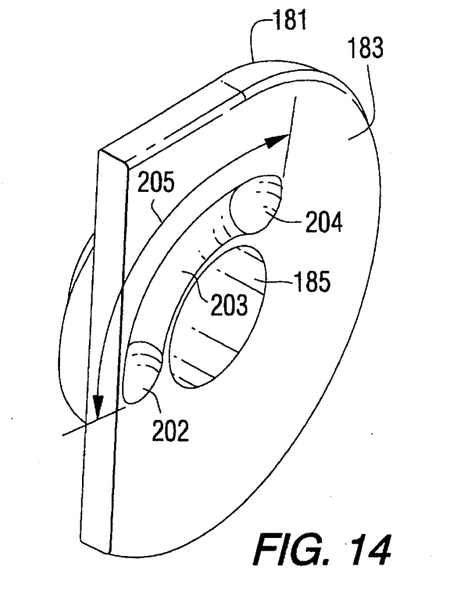

Compression spring 155 serves to bias its associated lid pin element toward a respective side panel of the lid, whereby the reduced thickness portion 137 of the first end 135 of the lid pin element 131 is normally urged into engagement with a slot defined between flat surfaces 171 at an interior bore 173 of a hinge arm element 175 of a respective one of hinge assemblies 121, 123, as shown in the top view of the lid in FIG. 5, the bottom perspective view of FIG. 9 and the top perspective view of FIG. 10.

Referring now to FIGS. 11–14, the structure of a respective hinge assembly is shown as comprising a hinge plate 181 having a generally semicircular perimeter. Hinge plate is fixedly attached to a respective side of the craft unit, for example, by adhesive attachment or mechanical fasteners. A first side 183 of hinge plate 181 is generally flat and has a circular bore 185 therethrough. Bore 185 is sized to accommodate a generally cylindrical shaft 182, which extends from a first side 184 of a hinge arm plate 186 of hinge arm element 175. Hinge arm element 175 has a cylindrical post 187 extending from a second side 188 thereof.

From a first end 191 of the cylindrical post 187, the above-referenced longitudinal bore 173 extends to a prescribed depth and terminates at a slot defined between flat surfaces 171 which, as noted above, are sized to engage and capture the reduced thickness portion 137 of the first end 135 of the lid pin element 131, when the lid pin element is biased into the hinge arm element by its associated compression spring. Adjacent to the shaft 182 is a hemispherical hillock or bump 201. When the shaft 182 of hinge arm 175 is inserted into bore 185 of hinge plate 181 and urged outwardly from a second side 189 of hinge plate 181 by the action of a compression spring, to be described, bump 201 is urged into intimate contact with the bottom of an arcuate channel or depression 203 formed in the first side 183 of hinge plate 181. Arcuate depression 203 has terminal ends 202 and 204 which are deeper than the remainder of the depression, so that bump 201 may be firmly seated therein, as the result of a biasing force imparted by a compression spring 227 that surrounds shaft 182, and is urged against a hinge arm cap 221, as diagrammatically illustrated in FIGS. 17, 18 and 19.

Arcuate depression 203 has a radial length 205 that limits pivotable movement of the lid to an arc in a range on the order of 90°–110° between its closed and open positions, as long as the tab elements 163 are in their normally spring biased positions, urging the reduced thickness portions 137 of their associated lid pin elements 131 into engagement with the slots defined between flat land surfaces 171 of the interior bores 173 of the hinge arm elements 175 of the hinge assemblies 121, 123. However, translation of tab elements 163 against the biasing of compression springs 155, disengages the reduced thickness portion 137 of the first end 135 of each lid pin element 131 from the flat surface 171 at the interior bore 173 of the hinge arm element 175 of a respective one of hinge assemblies 121, 123, thereby allowing the lid 50 to rotate on the order of 180° from its open position, shown in FIG. 3, to its fully extended position, shown in FIG. 4. In this fully extended position, when (finger) pressure against the tab elements 163 is released and the tab elements 163 are allowed to again be biased by compression springs 155 into bores 173, the reduced thickness portions 173 of the lid pin elements 131 will engage the slots defined between the flat surfaces 171 of the interior bores of the hinge arm elements 175 of the hinge assemblies 121, 123, so as to stably lock the lid in its fully extended position shown in FIG. 4.

Figure 16:
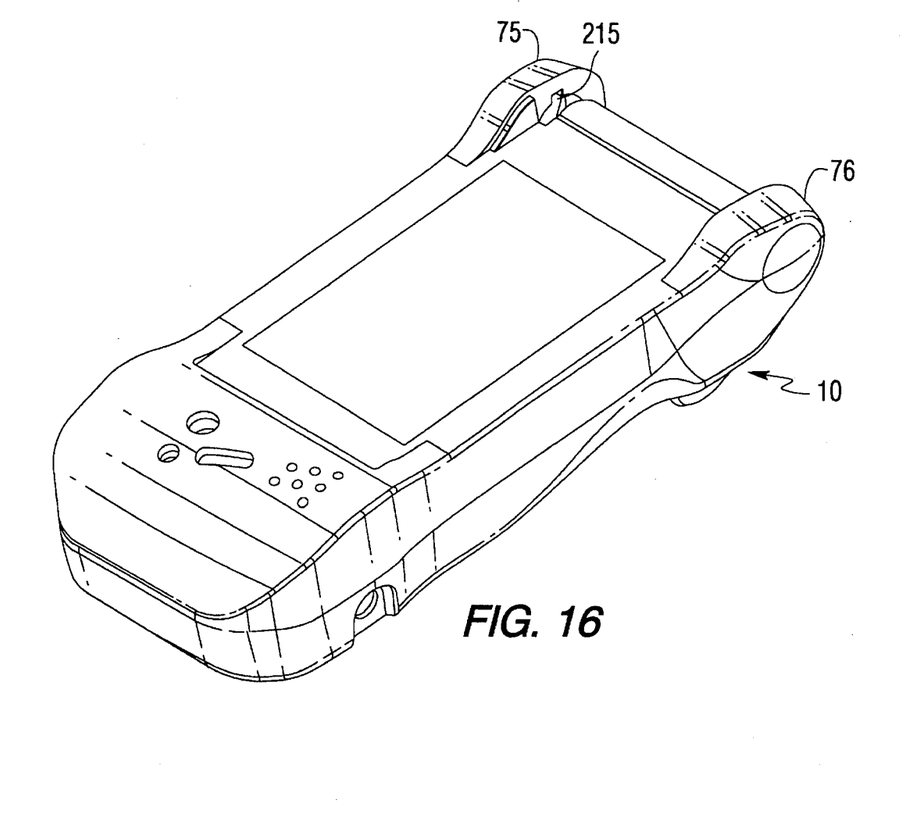
FIG. 16 diagrammatically illustrates a keyed slot in a lid pivot attachment of a craft unit.

FIG. 15 diagrammatically illustrates the manner in which shaft 182 extends through a cylindrical retaining member 209 at a second side 189 of hinge plate 181. Cylindrical retaining member 209 is surrounded by a generally annular or ring shaped element 211 having a projection or key tab 213. FIG. 16 shows a corresponding keyed slot 215 in a respective one of lid pivot attachments 75, 76, of the craft unit, which is sized to conform with keyed element 211. Key tabs 213 on the left and right side elements 211 serve to properly capture the ends of the pivotable lid assembly into lid pivot attachments 75, 76 of the craft unit.

Figures 17, 18, 19:
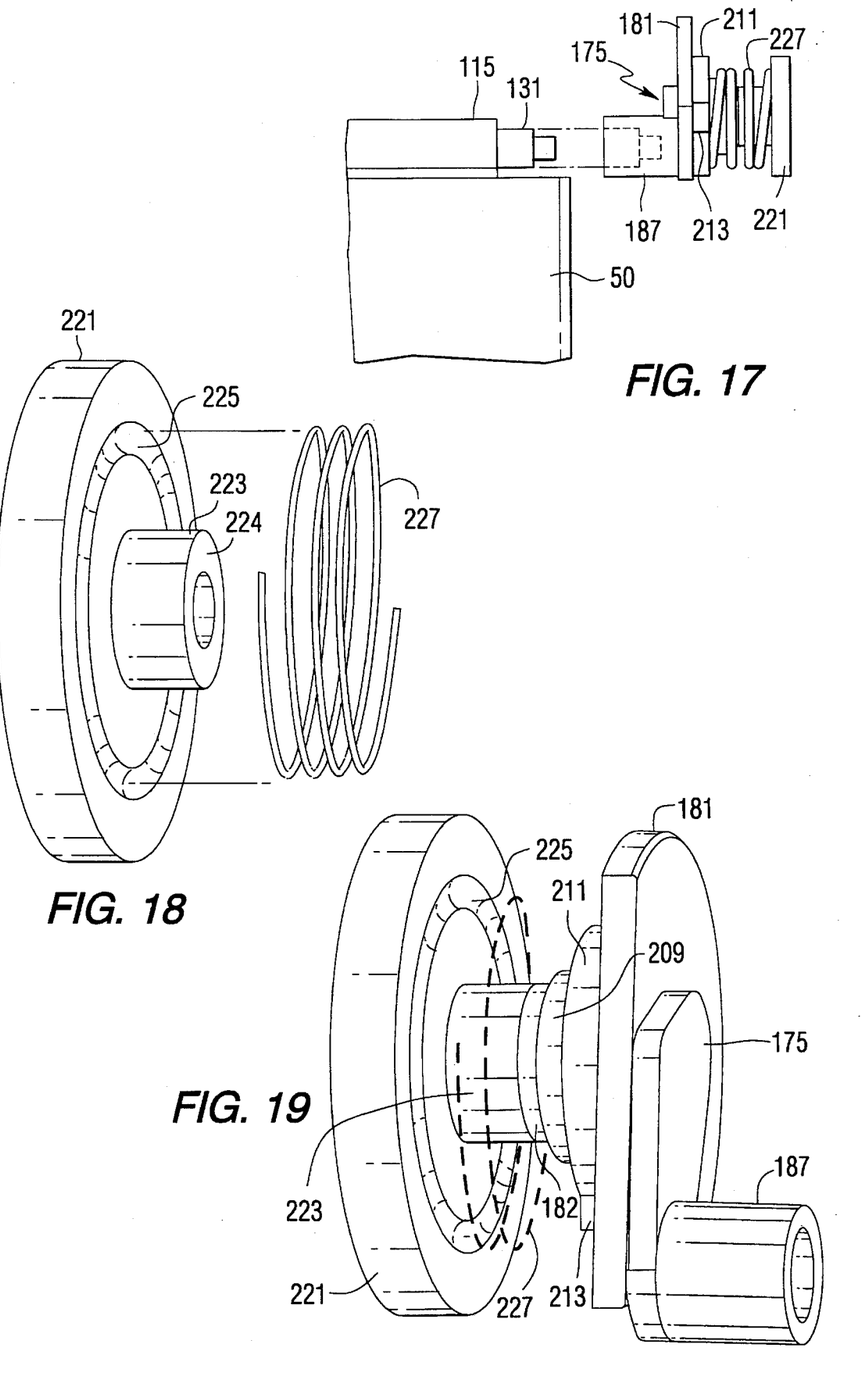
FIG. 17 diagrammatically illustrates a top view of a hinge arm cap and compression spring mounted on a hinge arm shaft.
FIG. 18 diagrammatically illustrates a hinge arm cap.
FIG. 19 diagrammatically illustrates a perspective view of a hinge arm cap affixed to an end portion of a hinge arm shaft extending through a hinge plate.

As pointed out above, since the terminal ends 202 and 204 of arcuate depression or channel 203 are deeper than the remainder of the arcuate depression, they serve to capture and retain the hemispherical bump 201 of the hinge arm element 175, when the bump 201 is seated in the channel by the action of compression spring 227, shown in FIGS. 17, 18 and 19 as surrounding the shaft 182 of the hinge arm element 175. Shaft 182 has an end face portion 190, to which and end face portion 224 of a shaft 223 of generally circular hinge arm cap 221 is affixed.

As shown in FIGS. 18 and 19, hinge arm cap 221 has a generally circular depression or recess 225, which is sized to accomodate a first end 226 of compression spring 227, a second end of which is seated against an annular or circular depression 228 in an outer face 230 of keyed ring element 211, shown in FIG. 15. As a result, compression spring 227 pushes hinge cap 221 away from the second side 189 of the hinge plate 181, and thereby urges or draws the first side 184 of hinge arm plate 186 against the first side 183 of the hinge plate 181, in which the arcuate channel 203 is formed. Consequently, the hemispherical bump 201 on the hinge arm 175 is firmly urged against the bottom of the arcuate channel 203, so that, upon engaging the deeper terminal ends 202 and 204 of the arcuate channel 203, which, as noted earlier, define closed and open positions of the lid 50 relative to the display panel, the lid 50 will be firmly retained at those attitudes.

With the hinge assembly of the display panel cover lid mechanically attached to the craft by means of the left and right side lid pivot attachments described above, the lid may be readily grasped by the craftsperson and pivoted between its closed position or attitude, shown in FIG. 2, and its open position shown in FIG. 3. Once the lid has been pivoted to its open position, the tabs 163 may be translated sideways against bias springs, thereby releasing the mechanical locking engagement between the lid pin elements and the hinge arms, and permitting the lid to be translated to its fully extended position, shown in FIG. 4. In this fully extended position, the lid pin elements will have rotated 180°, so that they may again be biased into engagement with post bores of the hinge arms, enabling the lid to be locked in a stable support position as a mechanical support for the craft unit.

While we have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A display panel lid arrangement for a craftsperson's signal processing and communications craft unit, said craft unit being operative to enable a craftsperson, who may be dispatched to a service site that is remotely located with respect to a telephone facility serving a subscriber line, to communicate with said telephone facility and with a test head that is connectable to said subscriber line, said craft unit having an input/output device, including a visual display panel, through which information input by said craftsperson is converted into prescribed signals and transmitted to a test system and through which information associated with the operation of said test system is presented to said craftsperson, said display panel lid arrangement comprising:

a display panel lid which is sized to cover said visual display panel; and a pivot attachment mounted to said craft unit, said pivot attachment being engageable with said lid and being configured to enable the lid to be pivoted between a closed position which covers said display panel, and an open position which allows said craftsperson to view said display panel, and to be pivoted beyond said open position to an extended position, and stably positioned at said extended position beneath said craft unit as a craft unit support member; and wherein said pivot attachment includes left side and right side hinge assemblies at respective left and right sides of said craft unit, a lid pin support element mounted adjacent to one end of said lid, and lid pin elements coupling opposite ends said lid pin support element with said left and right side hinge assemblies, respectively.

2. A display panel lid arrangement according to claim 1, wherein said pivot attachment is configured to stably lock said lid in its fully extended position as said craft unit support member.

3. A display panel lid arrangement according to claim 1, wherein a respective lid pin element comprises a cylindrical body portion, which is joined to a tab element by an arm therebetween, said tab element is translatable along an underside side of said lid, said cylindrical body portion having a first end engaging said lid pin support element and a second end being engageable with a respective one of said left side and right side hinge assemblies.

4. A display panel lid arrangement according to claim 3, further including a longitudinal channel element disposed immediately adjacent to said lid pin support element at the rear edge of the lid, and wherein said arm fits within a slot in said longitudinal channel element.

5. A display panel lid arrangement according to claim 3, wherein said first end of said cylindrical body of said lid pin element is biased by a compression spring toward a respective side of said lid, so that said second end of said cylindrical body of said lid pin element may be urged into engagement with a lid pin-capturing portion of a respective hinge assembly.

6. A display panel lid arrangement according to claim 5, wherein a respective hinge assembly comprises a hinge plate captured adjacent to a respective side portion of said craft unit, and a hinge arm element rotatably supported on said hinge plate, said hinge arm having a post containing an interior bore, sized to receive said second end of said lid pin.

7. A display panel lid arrangement according to claim 6, wherein said hinge arm includes a shaft extending through said hinge plate, said shaft being surrounded by a generally annular element having a key tab, that is sized and shaped to fit within a corresponding keyed slot in a respective hinge plate attachment on said craft unit.

8. A display panel lid arrangement according to claim 7, wherein said hinge arm further includes a bump, which is sized to ride in an arcuate depression in a first side of said hinge plate, and wherein said hinge arm is biased toward said hinge plate so that said bump is urged into said arcuate depression in said first side of said hinge plate.

9. A display panel lid arrangement according to claim 8, wherein said arcuate depression has a radial length which limits pivotable movement of said lid between said closed and open positions, with opposite ends of said arcuate depression being configured to enable said bump to be firmly seated therein.

10. A display panel lid arrangement according to claim 9, wherein said cylindrical body portion of said lid pin element is configured such that, as long as said tab element is in its normally spring biased position, it urges said second end of said cylindrical body portion of said lid pin element into capturing engagement with said interior bore of said hinge arm element of said hinge assembly.

11. A display panel lid arrangement according to claim 9, wherein said second end of said cylindrical body portion of said lid pin has a reduced thickness portion which is sized to engage a capturing slot in said hinge arm, in response to said cylindrical body portion of said lid pin being spring biased toward said hinge arm.

12. A display panel lid attachment arrangement for a craft unit, which is operative to enable a craftsperson, who may be dispatched to a service site located remotely with respect to a telephone facility serving a subscriber line, to communicate with said telephone facility and with a test head that is connectable to said subscriber line, said craft unit having a visual display panel, through which information is displayed to said craftsperson, said display panel lid attachment arrangement comprising hinge assemblies mounted to said craft unit, and hinge assembly attachment elements supportable on said lid and being configured to engage said hinge assemblies so as to enable said lid to be pivoted between a closed position which covers said display panel, and an open position which allows said craftsperson to view said display panel, and to be pivoted beyond said open position to an extended position, and stably positioned at said extended position beneath said craft unit as a craft unit support member; and wherein said hinge assemblies include left side and right side hinge assemblies at left and right sides of said craft unit, and wherein a respective hinge assembly attachment element comprises a lid pin supported by a lid pin support element mounted adjacent to one end of said lid, and wherein a respective lid pin is configured to couple an end of said lid pin support with one of said left and right side hinge assemblies.

13. A display panel lid attachment arrangement according to claim 12, wherein said hinge assembly attachment elements are configured to engage said hinge assemblies so as to lock said lid in its fully extended position as said craft unit support member.

14. A display panel lid attachment arrangement according to claim 12, wherein a respective lid pin element comprises a cylindrical body portion, which is joined to a tab element by an arm therebetween, said tab element being translatable along an underside side of said lid, said cylindrical body portion having a first end engaging said lid pin support element and a second end engageable with a respective hinge assembly.

15. A display panel lid attachment arrangement according to claim 14, further including a longitudinal channel element disposed immediately adjacent to said lid pin support element at the rear edge of the lid, and wherein said arm fits within a slot in said longitudinal channel element.

16. A display panel lid attachment arrangement according to claim 14, wherein said first end of said cylindrical body of said lid pin element is biased by a compression spring toward a respective side of said lid, so that said second end of said cylindrical body of said lid pin element may be urged into engagement with a lid pin-capturing portion of a respective hinge assembly.

17. A display panel lid attachment arrangement according to claim 16, wherein a respective hinge assembly comprises a hinge plate captured adjacent to a respective side portion of said craft unit, and a hinge arm element rotatably supported on said hinge plate, said hinge arm having a post containing an interior bore, sized to receive said second end of said lid pin.

18. A display panel lid attachment arrangement according to claim 17, wherein said hinge arm includes a shaft extending through said hinge plate, said shaft being surrounded by a generally annular element having a key tab, that is sized and shaped to fit within a corresponding keyed slot in a respective hinge plate attachment on said craft unit.

19. A display panel lid attachment arrangement according to claim 18, wherein said hinge arm further includes a bump, which is sized to ride in an arcuate depression in a first side of said hinge plate, said hinge arm being biased toward said hinge plate so that said bump is urged into said arcuate depression in said first side of said hinge plate.

20. A display panel lid attachment arrangement according to claim 19, wherein said arcuate depression has a radial length which limits pivotable movement of said lid between said closed and open positions, with terminal ends of said arcuate depression being configured to enable said bump to be firmly seated therein.

21. A display panel lid attachment arrangement according to claim 20, wherein said cylindrical body portion of said lid pin element is configured such that, as long as said tab element is in its normally spring biased position, it urges said second end of said cylindrical body portion of said lid pin element into capturing engagement with said interior bore of said hinge arm element of said hinge assembly.

22. A display panel lid attachment arrangement according to claim 20, wherein said second end of said cylindrical body portion of said lid pin has a reduced thickness portion which is sized to engage a capturing slot in said hinge arm, in response to said cylindrical body portion of said lid pin being spring biased toward said hinge arm.

* * * * *